(12) United States Patent
Gu

(10) Patent No.: US 6,340,968 B1
(45) Date of Patent: Jan. 22, 2002

(54) QUICK START APPARATUS FOR A DISPLAY AND METHOD THEREOF

(75) Inventor: Sung-Jin Gu, Suwon-si (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/221,878

(22) Filed: Dec. 29, 1998

(30) Foreign Application Priority Data

Dec. 30, 1997 (KR) .............................. 97-77658

(51) Int. Cl.$^7$ ................................. G09G 5/00
(52) U.S. Cl. ................... 345/211; 348/730; 345/10
(58) Field of Search .................. 345/211, 10, 11, 345/12; 348/730; 358/168; 248/917; 472/51

(56) References Cited

U.S. PATENT DOCUMENTS

| | | | | |
|---|---|---|---|---|
| 4,129,885 A | * | 12/1978 | Chovanec | 3418/730 |
| 5,264,934 A | * | 11/1993 | Nakagawa | 348/569 |
| 5,483,464 A | * | 1/1996 | Song | 713/300 |
| 5,870,086 A | * | 9/1999 | Bang | 345/212 |
| 5,961,648 A | * | 10/1999 | Choi et al. | 713/323 |
| 6,006,335 A | * | 12/1999 | Choi et al. | 713/310 |

* cited by examiner

Primary Examiner—Steven Saras
Assistant Examiner—Christopher J. Maier
(74) Attorney, Agent, or Firm—Staas & Halsey LLP

(57) ABSTRACT

An apparatus for quickly displaying a video signal on a display upon power ON using a microcomputer to control the display when the power is switched on. The microcomputer transmits a first control signal for regulating a gain of the video signal to a pre-amplifier, after a power circuit is switched ON, and outputs a second control signal for regulating bias level of the video signal amplified and outputted by a main amplifier connected to the pre-amplifier.

8 Claims, 2 Drawing Sheets

QUICK START APPARATUS FOR A DISPLAY AND METHOD THEREOF

CROSS-REFERENCE TO RELATED APPLICATIONS

Figure 1:
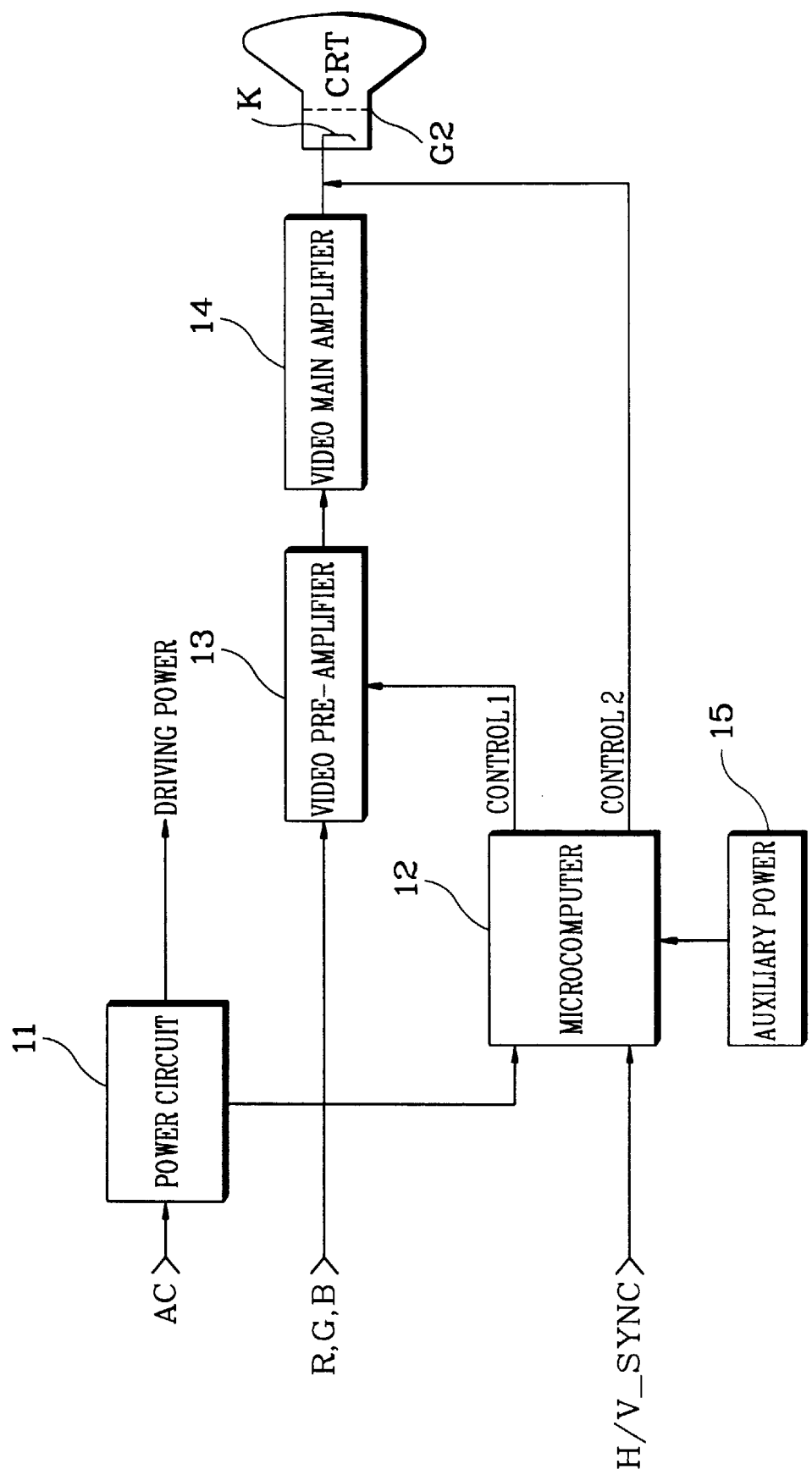

This application makes reference to, incorporates the same herein, and claims all benefits accruing under 35 U.S.C. §119 from the application entitled Quick Start Device of Display Apparatus and Start Method filed with the Korean Industrial Property Office on Dec. 30, 1997 and duly assigned Ser. No. P97-77658.

BACKGROUND OF THE INVENTION

1. Field of the Invention

The present invention relates to a quick start apparatus for a display and method thereof, and more particularly, to an apparatus for quickly displaying a video signal on a display by a microcomputer when the display power is switched ON.

2. Discussion of Related Art

A display unit equipped with a display, such as a cathode ray tube, displays an image converted from video signals using electron beams. The electron beams are composed of a bunch of electrons emitted from a cathode preheated by a heater.

The electron beam emitted from the cathode is regulated by a bias between the cathode and a grid. Accordingly, conventional quick start circuits supply a constant voltage to the heater so as to preheat the heater. This reduces the initial heating time, thereby reducing the start-up time for converting video signals into an image on the display. Quick start circuits are also known which rapidly supply high voltage power to the heater to reduce the heating time.

Unfortunately, if the heater is constantly supplied with power over a long term, the life of the heater is shortened. Further, if the heater is rapidly supplied with high voltage power, the efficiency of the heater deteriorates, shortening the life of the heater.

SUMMARY OF THE INVENTION

Accordingly, to overcome such drawbacks in the conventional art, it is an object of the present invention to provide a quick start apparatus for a display for displaying a video signal on a display which quickly regulates the gain of a pre-amplifier and a bias level given to a cathode ray tube when the power is switched on.

Another object of the present invention is to provide a method of quick starting a display by quickly regulating the gain of a pre-amplifier and a bias level given to a cathode ray tube when the power is switched on.

To achieve these and other advantages and in accordance with the purpose of the present invention, as embodied and broadly described, there is provided a quick start apparatus for, upon power ON, quickly displaying a video signal, the apparatus comprises: a power circuit supplying a driving power to a displaying device; and a microcomputer transmitting a first control signal for regulating a gain of the video signal to a pre-amplifier so as to quickly display the video signal after the power of the power circuit is switched on, and outputting a second control signal for regulating bias level of the video signal amplified and outputted by a main amplifier.

BRIEF DESCRIPTION OF THE ATTACHED DRAWINGS

Figure 2:
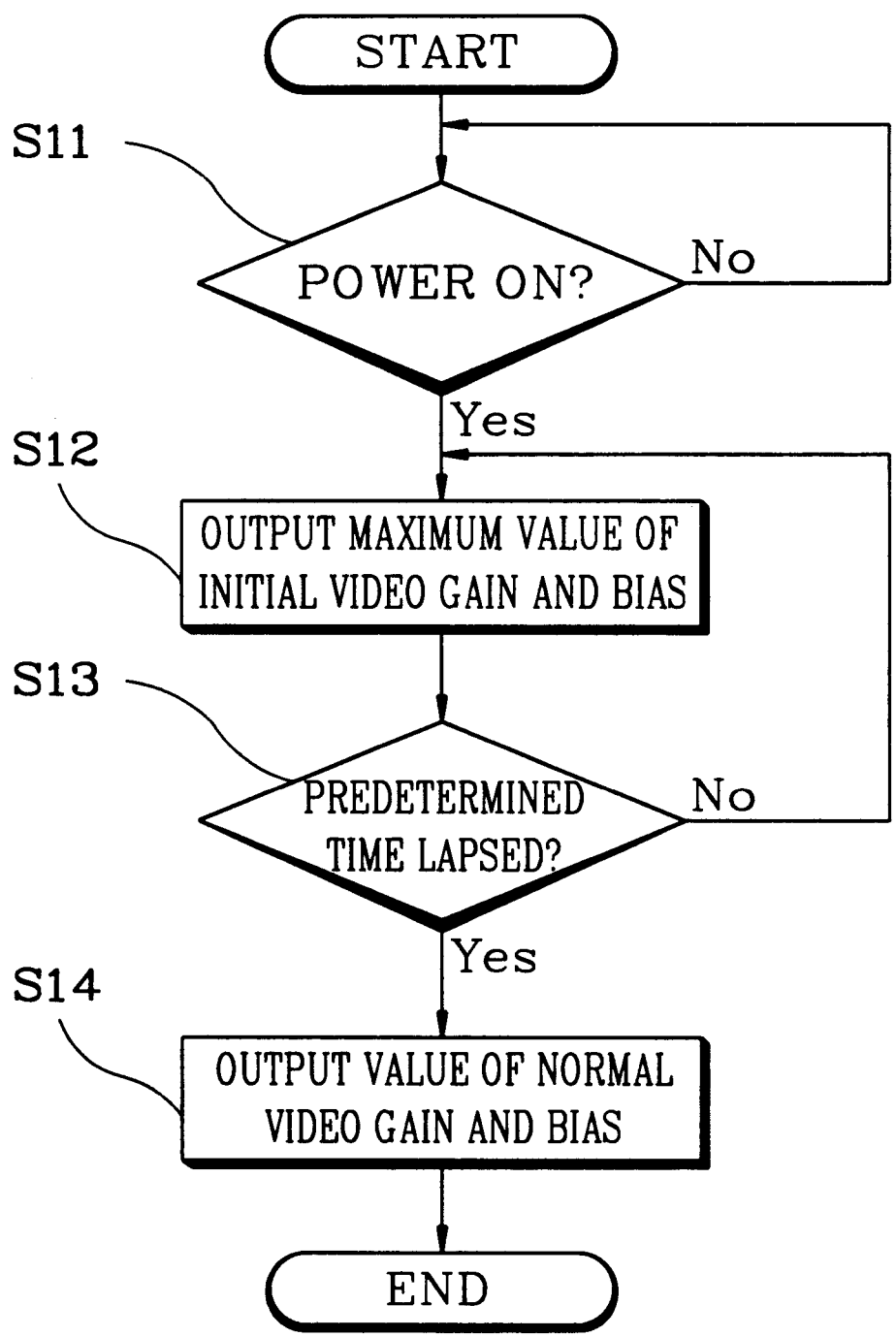

These and other objects and advantages of the invention will become apparent and more readily appreciated from the following description of the preferred embodiments, taken in conjunction with the accompanying drawings of which:

FIG. 1 is a block diagram of a circuit for a display with a quick start apparatus according to a preferred embodiment of the present invention; and FIG. 2 is a flowchart showing a quick start method according to a preferred embodiment of the present invention.

DETAILED DESCRIPTION OF PREFERRED EMBODIMENT

Reference will now made in detail to the present preferred embodiments of the present invention, examples of which are illustrated in the accompanying drawings, wherein like reference numerals refer to like elements throughout. The embodiments are described below in order to explain the present invention by referring to the figures.

FIG. 1 is a block diagram of a circuit for a display with a quick start apparatus according to a preferred embodiment of the present invention. More specifically, FIG. 1 shows a quick start apparatus for quickly displaying an image, converted from video signals, when power is initially turned ON. The quick start apparatus generally includes a power circuit 11 supplying a driving power to a display unit, and a microcomputer 12. An optional auxiliary power source 15 supplies clean power to the microcomputer 12. The microcomputer 12 transmits a first control signal control 1, for regulating a gain of the RGB video signal, to a video pre-amplifier 13 and a second control signal for regulating a bias level of the RGB video signals. The video pre-amplifier 13 converts RGB video signals into an image for display on a CRT G2, while a video main amplifier 14 performs amplification and the actual output of the RGB video signals to the CRT G2.

FIG. 2 is a flowchart showing a quick start method according to a preferred embodiment of the present invention. The method is started in step S11 when the power circuit 11 is switched ON. Generally, the display is operated by receiving a driving power from the power circuit 11 and displaying RGB video signals transmitted from a host (not shown). The power circuit 11, when switched ON, receives alternating current and generates a driving power, supplied to each circuit in the display, in the form of a direct current voltage.

Next in step S12, the microcomputer 12 cause the RGB video signal to have a maximum video gain and bias. More specifically, when the power circuit 11 is switched ON, a gain and bias level of the initial RGB video signal is amplified to a maximum value by the first control signal control 1 and the second control signal control 2 outputted from the microcomputer 12. The first control signal control 1 is transmitted to the video pre-amplifier 13 which amplifies the RGB video signal to a maximum gain, using the first control signal control 1, and outputs the maximums gain of the RGB video signal to the video main amplifier 14. The video main amplifier 14 receives and sufficiently amplifies the RGB video signal and transmits the amplified RGB video signal to a cathode K of the cathode ray tube G2.

At this time, the RGB video signal is regulated to a maximum bias level by the second signal 2 outputted from the microcomputer 12. The second control signal control 2 acts as the power source between the cathode K and the second grid G1.

If the bias level is regulated to the maximum, the electrons can be emitted from the cathode K before the heater (not shown) comes to an appropriate temperature. Accordingly, the RGB video signal can be quickly displayed on the display.

Thereafter, in step S13, a check is made as to whether a predetermined time has lapsed from when the RGB video signal was regulated to have a maximum gain and bias in step S13. If the predetermined time has not lapsed the method returns to step S12 and a RGB video signal with a maximum gain and bias is continued to be outputted. Once the predetermined time period has lapsed, the operation is ended with the output of a RBG video signal having a normal gain and bias in step S14. In other words, the microcomputer 12 activates the output of the first control signal control 1 and the second control signal control 2 only for a predetermined time. More specifically, the output of the first control signal control 1 and the second control signal control 2 are activated until the heater comes to the appropriate temperature. To determine the time period, the microcomputer 12 can calculate, based on previous empirical iterations, the time and stores this time in advance.

Once again, after the predetermined time has lapsed, the microcomputer 12 inactivates the output of the first control signal control 1 and the second control signal control 2 and activates a normal gain and bias level of the RGB video signal. Subsequently, the RGB video signal is displayed on the cathode ray tube according in a normal fashion.

As described above, the present invention regulates the gain and bias level of the video signal so as to quickly display the video signal. Accordingly, the present invention provides the effect of shortening the life of the cathode ray tube while quickly displaying the video signal.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A quick start apparatus for a display device using a pre-amplifier connected to a main amplifier, the quick start apparatus comprising:

a power circuit that supplies a driving power to the displaying device; and a microcomputer that transmits a first control signal to the pre-amplifier, regulating a gain of the video signal, and a second control signal, regulating bias level of the video signal amplified and outputted by a main amplifier, so as to quickly display the video signal when the power circuit is switched ON.

2. The apparatus as claimed in claim 1, further comprising:

an auxiliary power source supplying a driving power to the microcomputer.

3. The apparatus as claimed in claim 1, wherein the first control signal causes the gain of the video signal to rise a maximum level.

4. The apparatus as claimed in claim 1, wherein the second control signal raises the bias of the video signal to a maximum level.

5. The apparatus as claimed in claim 1, wherein the microcomputer transmits the first and second control signals for a predetermined time sufficient to allow a heater in a CRT of the display to heat.

6. A method for quick starting a display of a video signal at power ON, the method comprising the steps of:

switching the power ON; and causing the gain and bias of a video signal to raise to a maximum level for a predetermined period of time.

7. A method as claimed in claim 6, further comprising:

checking whether the predetermined time has lapsed and if the predetermined time has lapsed causing the gain and bias to lower to a normal level.

8. A method as claimed in claim 6, wherein the predetermined time is the time it takes a heater in the display to heat.

* * * * *